(12) United States Patent
Marastoni

(10) Patent No.: US 10,773,941 B2
(45) Date of Patent: Sep. 15, 2020

(54) BOTTLING LINE AND METHOD

(71) Applicant: SACMI COOPERATIVA MECCANICI IMOLA SOCIETA' COOPERATIVA, Imola (Bologna) (IT)

(72) Inventor: Daniele Marastoni, San Giovanni in Persiceto (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 378 days.

(21) Appl. No.: 14/361,523

(22) PCT Filed: Dec. 3, 2012

(86) PCT No.: PCT/IB2012/056922
§ 371 (c)(1),
(2) Date: May 29, 2014

(87) PCT Pub. No.: WO2013/080189
PCT Pub. Date: Jun. 6, 2013

(65) Prior Publication Data
US 2014/0318083 A1     Oct. 30, 2014

(30) Foreign Application Priority Data

Dec. 2, 2011    (IT) .............................. BO2011A0691

(51) Int. Cl.
*B67C 7/00*         (2006.01)
*B29C 49/42*      (2006.01)
(Continued)

(52) U.S. Cl.
CPC ............ *B67C 7/0073* (2013.01); *B29C 49/06* (2013.01); *B29C 49/4205* (2013.01);
(Continued)

(58) Field of Classification Search
CPC ....... B65B 3/022; B65B 55/00; B65B 65/003; B65B 3/04; B65B 7/28; B67C 2003/227;
(Continued)

(56) References Cited

U.S. PATENT DOCUMENTS 3,220,596 A    11/1965   Martin
3,246,790 A     4/1966   Martin
(Continued)

FOREIGN PATENT DOCUMENTS

DE            32 32 039 A1    3/1983
DE            10050660 A1    4/2002
(Continued)

*Primary Examiner* — Dariush Seif
(74) *Attorney, Agent, or Firm* — Pearne & Gordon LLP

(57) ABSTRACT

A continuous cycle bottling line (1) for containers of thermoplastic material, comprises: a parison (4) moulding unit (3), a thermal conditioning unit (6) for the parisons (4); a blow-moulding unit (10); a filling unit (12) configured to receive the blow-moulded containers (11) from the blow-moulding unit (10) and to fill them with liquid or semi-liquid food products; a moulding unit (13) for making caps (14) of plastic material; a capping unit (15); a storage system (2) which is configured to contain the parisons (4) and the caps (14), which is interconnected with the units making up the line, and which defines inside it a controlled-atmosphere environment; the line defines an integrated system where the connections of the different units with each other and with the storage system (2) are located in a controlled-atmosphere environment.

25 Claims, 9 Drawing Sheets

(51) Int. Cl.

| | | |
|---|---|---|
| *B29C 49/06* | (2006.01) | |
| *B29C 49/46* | (2006.01) | |
| *B29C 49/64* | (2006.01) | |
| *B65B 3/02* | (2006.01) | |
| *B65B 3/04* | (2006.01) | |
| *B65B 7/28* | (2006.01) | |
| *B65G 1/06* | (2006.01) | |
| *B65G 37/00* | (2006.01) | |
| *B65G 47/00* | (2006.01) | |
| *B65G 65/00* | (2006.01) | |
| *B65G 65/23* | (2006.01) | |
| *B29K 105/00* | (2006.01) | |
| *B67C 3/22* | (2006.01) | |
| *B29L 31/00* | (2006.01) | |
| *B29L 31/56* | (2006.01) | |
| *B29C 49/36* | (2006.01) | |
| *B29C 49/68* | (2006.01) | |
| *B29C 49/02* | (2006.01) | |

(52) U.S. Cl.
CPC ......... *B29C 49/4273* (2013.01); *B29C 49/46* (2013.01); *B29C 49/6418* (2013.01); *B65B 3/022* (2013.01); *B65B 3/04* (2013.01); *B65B 7/28* (2013.01); *B65G 1/06* (2013.01); *B65G 37/00* (2013.01); *B65G 47/00* (2013.01); *B65G 65/00* (2013.01); *B65G 65/23* (2013.01); *B67C 7/002* (2013.01); *B29C 49/36* (2013.01); *B29C 49/6427* (2013.01); *B29C 49/68* (2013.01); *B29C 2049/028* (2013.01); *B29C 2049/4697* (2013.01); *B29K 2105/258* (2013.01); *B29L 2031/565* (2013.01); *B29L 2031/7158* (2013.01); *B67C 2003/227* (2013.01); *B67C 2003/228* (2013.01)

(58) Field of Classification Search
CPC . B67C 2003/228; B67C 7/0073; B67C 7/002; B65G 1/06; B65G 37/00; B65G 47/00; B65G 65/00; B65G 65/23; B29C 49/06; B29C 49/4205; B29C 49/4273; B29C 49/46; B29C 49/6418; B29C 49/36; B29C 49/6427; B29C 49/68; B29C 2049/028; B29C 2049/4697; B29K 2105/258; B29L 2031/565; B29L 2031/7158
USPC ...... 53/415, 452, 453, 471, 487, 136.1, 558, 53/559, 561, 281, 282, 390, 331.5
See application file for complete search history.

(56) References Cited

U.S. PATENT DOCUMENTS

| | | | | |
|---|---|---|---|---|
| 4,104,807 A * | 8/1978 | Braun | .................. | B65B 9/04 34/287 |
| 4,468,165 A | 8/1984 | Kawasaki | | |
| 4,597,242 A * | 7/1986 | Hendriks | .............. | B67C 7/0073 426/399 |
| 5,059,079 A | 10/1991 | Foulke et al. | | |
| 5,409,545 A | 4/1995 | Levey et al. | | |
| 5,702,734 A * | 12/1997 | Hartman | ............. | B29C 45/1769 264/237 |
| 5,953,234 A | 9/1999 | Singer et al. | | |
| 5,996,322 A * | 12/1999 | La Barre | .................. | B65B 3/022 198/347.1 |
| 6,119,433 A * | 9/2000 | Kitahora | ................ | B65B 55/02 141/98 |
| 6,185,910 B1 * | 2/2001 | Achhammer | ......... | B67C 7/0073 134/73 |
| 6,189,292 B1 * | 2/2001 | Odell | ....................... | B65B 55/10 141/1 |
| 6,230,472 B1 * | 5/2001 | Stahlecker | ................ | A61L 2/14 53/331.5 |
| 6,341,469 B1 * | 1/2002 | Derouault | ................ | B67B 3/062 53/281 |
| 6,428,304 B1 | 8/2002 | Sartor et al. | | |
| 6,688,839 B1 | 2/2004 | Hirschek et al. | | |
| 7,097,045 B2 | 8/2006 | Winkler | | |
| 7,717,774 B2 * | 5/2010 | Rothbauer | ................ | A61L 2/00 454/187 |
| 7,900,422 B2 * | 3/2011 | Fischer | ................. | B67C 7/0073 53/167 |
| 8,505,269 B2 * | 8/2013 | Kobayashi | .............. | A61L 2/087 53/111 R |
| 8,506,869 B2 | 8/2013 | Lappe et al. | | |
| 8,556,620 B2 | 10/2013 | Parrinello et al. | | |
| 8,677,723 B2 * | 3/2014 | Bottger | .................. | A61J 1/2093 53/425 |
| 9,296,148 B2 | 3/2016 | Feuilloley | | |
| 9,321,621 B2 | 4/2016 | Kitano et al. | | |
| 9,415,429 B2 | 8/2016 | Benedetti | | |
| 9,446,550 B2 * | 9/2016 | Parrinello | ............... | B29B 11/12 |
| 2003/0083769 A1 | 5/2003 | Yamazaki | | |
| 2003/0147738 A1 | 8/2003 | Hanel | | |
| 2004/0187444 A1 * | 9/2004 | Hutchinson | ........... | B65B 7/2835 53/453 |
| 2004/0193311 A1 * | 9/2004 | Winkler | ................ | B65G 1/1378 700/216 |
| 2005/0097863 A1 * | 5/2005 | Taggart | ................. | B67C 7/0033 53/167 |
| 2005/0154184 A1 | 7/2005 | Shi | | |
| 2005/0217211 A1 * | 10/2005 | Py | ......................... | B29C 45/006 53/426 |
| 2005/0223677 A1 | 10/2005 | Py | | |
| 2006/0111812 A1 | 5/2006 | Okamoto et al. | | |
| 2007/0220835 A1 * | 9/2007 | Till | ......................... | B29C 49/42 53/471 |
| 2008/0017045 A1 * | 1/2008 | McGuire | ................ | B01D 53/02 99/323 |
| 2008/0029481 A1 * | 2/2008 | Kothari | ................ | B81C 1/00579 216/58 |
| 2008/0042325 A1 * | 2/2008 | Imatani | ................... | B29B 11/12 264/454 |
| 2008/0118335 A1 | 5/2008 | Ishida et al. | | |
| 2008/0166442 A1 | 7/2008 | Balboni et al. | | |
| 2008/0296820 A1 | 12/2008 | Bambi et al. | | |
| 2009/0071104 A1 * | 3/2009 | Fischer | ................... | A61L 2/208 53/426 |
| 2009/0077933 A1 * | 3/2009 | Backhaus | ............ | B65G 47/846 53/561 |
| 2009/0127076 A1 | 5/2009 | Balboni et al. | | |
| 2009/0186571 A1 * | 7/2009 | Haro | ................. | H01L 21/67017 454/241 |
| 2009/0223175 A1 * | 9/2009 | Monzel | ................. | B65B 7/2821 53/456 |
| 2010/0127435 A1 | 5/2010 | Feuilloley | | |
| 2010/0133729 A1 * | 6/2010 | Shah | ...................... | B29C 49/06 264/537 |
| 2010/0205903 A1 | 8/2010 | Py | | |
| 2010/0256248 A1 * | 10/2010 | Salmang | ............. | B29C 49/0005 521/139 |
| 2011/0056172 A1 * | 3/2011 | Klenk | .................... | B29C 49/36 53/268 |
| 2011/0094616 A1 * | 4/2011 | Hayakawa | ............. | B67C 3/242 141/1 |
| 2011/0109018 A1 * | 5/2011 | Parrinello | ............... | B65B 47/08 264/524 |
| 2011/0146202 A1 * | 6/2011 | Imatani | ................... | B29B 11/12 53/167 |
| 2011/0147194 A1 * | 6/2011 | Kamen | ................. | B01D 1/0082 202/185.1 |
| 2011/0219728 A1 * | 9/2011 | Humele | ................. | B29C 49/42 53/452 |
| 2011/0260372 A1 * | 10/2011 | Hahn | ..................... | B29C 49/42 264/500 |
| 2011/0291332 A1 * | 12/2011 | Voth | ..................... | B29B 13/024 264/532 |

(56) References Cited

U.S. PATENT DOCUMENTS

| | | | |
|---|---|---|---|
| 2012/0070522 A1* | 3/2012 | Voth | B29C 49/46 |
| | | | 425/88 |
| 2012/0085071 A1* | 4/2012 | Hahn | B29C 49/6436 |
| | | | 53/411 |
| 2012/0100238 A1 | 4/2012 | Humele et al. | |
| 2012/0101627 A1 | 4/2012 | Lert | |
| 2012/0160637 A1 | 6/2012 | Itoh et al. | |
| 2012/0222801 A1* | 9/2012 | Pedercini | B29C 53/44 |
| | | | 156/184 |
| 2012/0286459 A1 | 11/2012 | Neubauer et al. | |
| 2013/0061557 A1* | 3/2013 | Kitano | B67C 7/0073 |
| | | | 53/167 |
| 2013/0328248 A1 | 12/2013 | Herold et al. | |
| 2014/0027956 A1 | 1/2014 | Parrinello et al. | |
| 2014/0157726 A1 | 6/2014 | Clusserath et al. | |
| 2014/0318083 A1 | 10/2014 | Marastoni | |
| 2014/0338291 A1* | 11/2014 | Parrinello | B29B 11/12 |
| | | | 53/561 |
| 2015/0274498 A1 | 10/2015 | Van Steen et al. | |
| 2015/0298906 A1* | 10/2015 | Marastoni | B29C 49/06 |
| | | | 414/267 |

FOREIGN PATENT DOCUMENTS

| | | | | |
|---|---|---|---|---|
| DE | 102008057403 | | 5/2010 | |
| DE | 102008057403 A1 * | 5/2010 | | B29C 49/42 |
| EP | 1 462 393 A1 | | 9/2004 | |
| EP | 1 462 393 B1 | | 8/2006 | |
| EP | 2 388 129 A1 | | 11/2011 | |
| EP | 2 447 038 A2 | | 5/2012 | |
| EP | 2578504 A1 | | 4/2013 | |
| GB | 1 039 511 A | | 8/1966 | |
| IT | 1359024 | | 3/2007 | |
| JP | S6048802 A | | 3/1985 | |
| JP | 2003081441 A | | 3/2003 | |
| JP | 2005280880 A | | 10/2005 | |
| JP | 2007106438 A | | 4/2007 | |
| JP | 2010524742 A | | 7/2010 | |
| WO | 99/55604 A1 | | 11/1999 | |
| WO | 2006092651 A1 | | 9/2006 | |
| WO | 2008/090207 A1 | | 7/2008 | |
| WO | 2008132603 A1 | | 11/2008 | |
| WO | 2009127962 A2 | | 10/2009 | |
| WO | WO 2009127962 A2 * | 10/2009 | | B29C 43/08 |
| WO | 2011148953 A1 | | 12/2011 | |

* cited by examiner

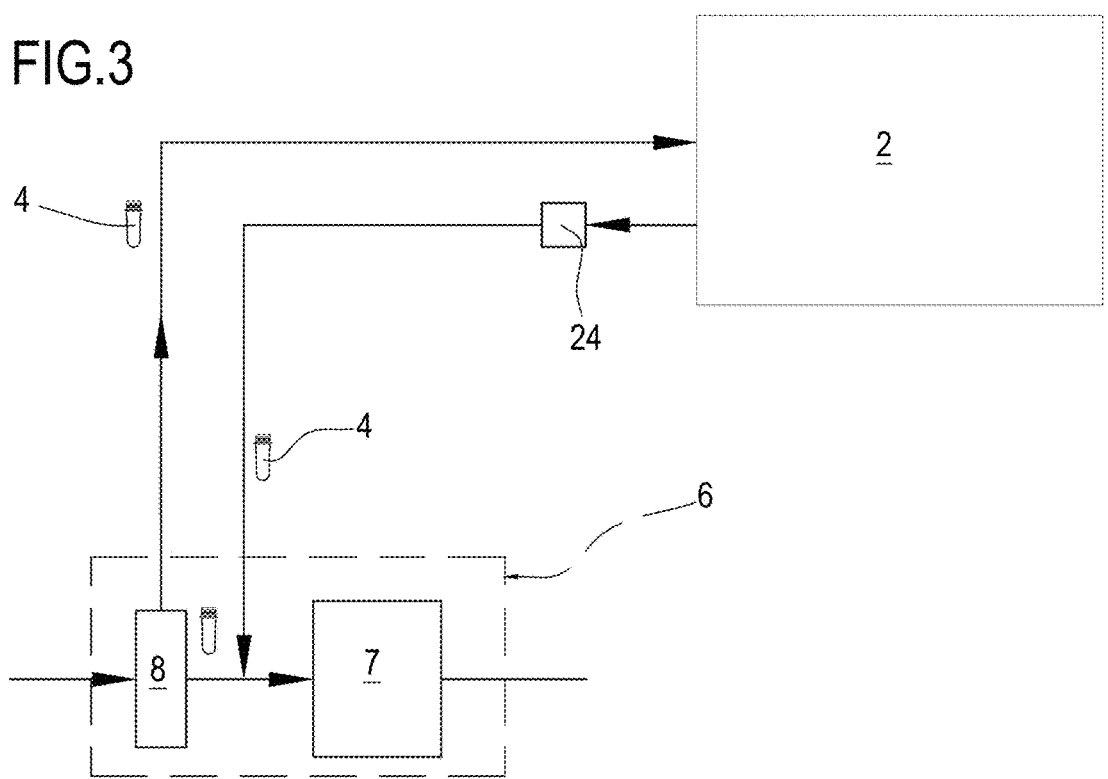
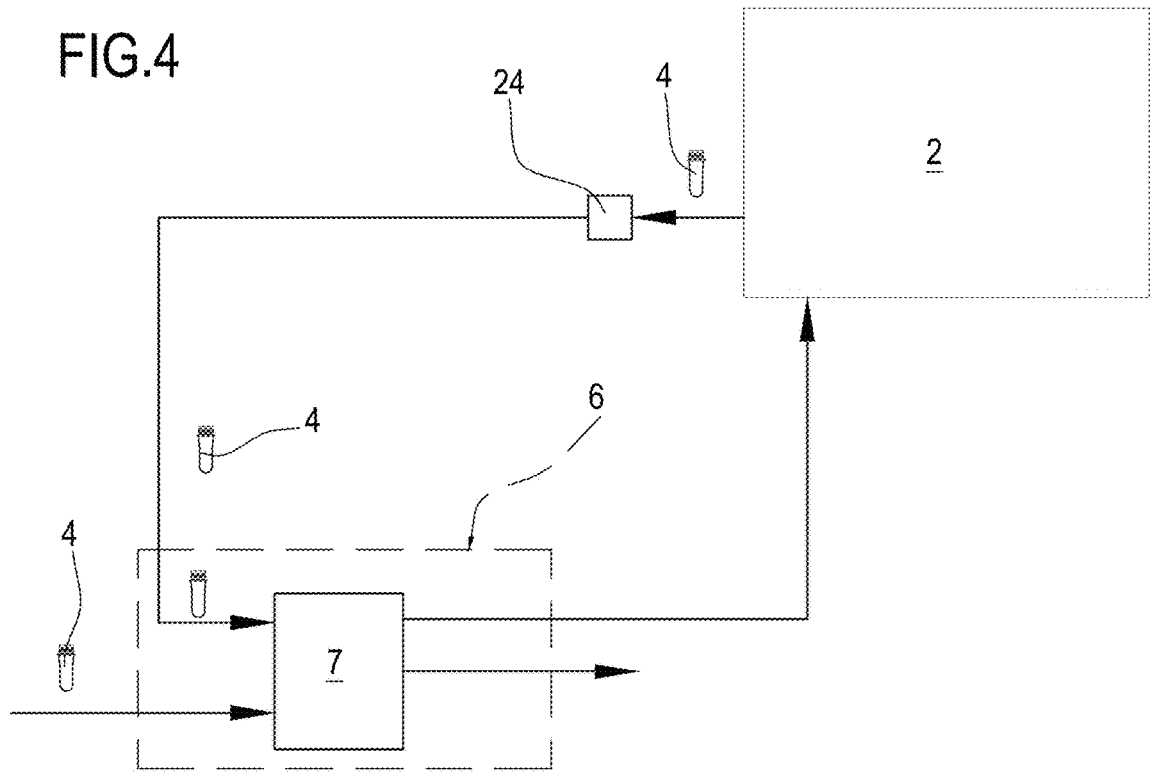

BOTTLING LINE AND METHOD

TECHNICAL FIELD

This invention relates to a continuous cycle line and method for bottling containers of thermoplastic material.

More specifically, the invention relates to a line and a method for making containers of thermoplastic material from raw plastic and filling them with liquid or semi-liquid food products.

These bottling lines comprise:
- a moulding unit for making parisons of thermoplastic material from the thermoplastic material in its raw form;
- a parison thermal conditioning unit configured to receive the parisons from the moulding machine and to heat the parisons;
- a blow-moulding unit configured to receive the heated parisons from the conditioning unit and to blow-mould them into the moulds in such a way as to make containers designed to be filled with liquid or semi-liquid food products;
- a filling unit configured to receive the containers from the blow-moulding machine and to fill them with liquid beverages;
- a moulding unit for making caps of plastic material from the plastic material in its raw form;
- a capping unit configured to receive the caps from the cap moulding unit and to apply the caps securely to respective full containers.

Generally speaking, these bottling lines have two main drawbacks: the first drawback is linked to the efficiency and reliability of the line, whilst the second drawback is linked to the need for cleanliness and hygiene during the entire process where food products are involved.

BACKGROUND ART

Generally speaking, in the prior art solutions, the drawback relating to efficiency and reliability is tackled by installing accumulation systems between one unit and another, so as to avoid the need for connecting the units to each other by positive control of the objects transferred from one unit to another (indeed, in that case, the units are always in step with each other). Thus, stopping one of the units does not involve stopping the entire line.

These accumulation systems, however, are to the disadvantage of line hygiene.

In this regard, patent WO2009127962 to the same Applicant as this invention discloses a system which comprises a parison moulding machine, an oven for the parisons and a blow-moulding machine. The system also comprises a cooling carousel interposed between the moulding machine and the oven, and a storage system connected to the cooling carousel and to the blow-moulding machine.

This solution makes it possible to deal with certain critical situations, in particular the shutting down of the blow-moulding machine (in which case the moulding machine continues to make parisons which are transferred to the storage system) and the shutting down of the moulding machine (in which case the blow-moulding machine can continue to be fed with parisons from the storage system).

This solution, however, does not solve the problem of hygiene which is, in fact, made worse by the risk of the parisons getting dirty as they pass through the storage system.

In light of this, it should be noted that patent document IT1359024, in the name of the same Applicant as this invention, describes a storage system containing parisons and caps for feeding respective units of a bottling line. The interior of the storage system is kept under conditions of overpressure so as to allow storage of heterogeneous objects, that is, parisons and caps.

However, patent IT1359024, too, fails to deal with the problem of hygiene and does not provide solutions able to guarantee the reliability and efficiency of the line.

Moreover, it should be noted that even document WO2009127962 does not provide solutions able to guarantee the reliability and efficiency of an entire bottling line but proposes only a solution to the problem of the reliability (that is, of the uninterrupted service) of the subsystem consisting of the blow-moulder and the parison moulding machine.

In light of this, it should be noted that the following problems exist in connection with the efficiency of the line.

Moulding machines which process raw plastic (for example to mould the parisons or caps) have a high thermal inertia.

The high thermal inertia of the moulding units has two consequences.

The first consequence is that stopping the units too frequently can lead to problems. Indeed, the units need to be kept on all the time and the frequency of machine shutdowns must be reduced to a minimum.

The second consequence, linked with the first, is that these machines are designed to make objects (parisons or caps) of the same colour for relatively long periods of time (for example, some months). Since changing the colour of the plastic the objects are made of means, obviously, that the machine must be stopped, this must be done as infrequently as possible Production requirements, however, make it necessary to change the colour of the bottles and caps more often (for example, weekly or fortnightly) than the colour change frequency recommended for the parison and cap moulding machines.

In light of this, the solutions adopted by the prior art for bottling lines tend to limit the efficiency of the line on account of the need to strike a compromise between the above mentioned opposite needs.

DISCLOSURE OF THE INVENTION

This invention has for an aim to provide a continuous cycle line and method for bottling containers of thermoplastic material which overcome the above mentioned drawbacks of the prior art.

More specifically, the aim of the invention is to provide a continuous cycle line and method for bottling containers of thermoplastic material which are particularly reliable and efficient and which, at the same time, guarantee a high level of hygiene.

These aims are fully achieved by the line and method according to the invention as characterized in the appended claims.

More specifically, the bottling line comprises at least one moulding unit for making parisons of thermoplastic material (for example, PET) from the plastic material in its raw form (for example, pellets).

The line also comprises a thermal conditioning unit for the parisons, configured to heat and cool the parisons.

The thermal conditioning unit is connected to the outfeed of the parison moulding machine.

It should be noted that the parison moulding machine is preferably (but not necessarily) a rotary machine. Preferably, also, the machine works by compression (that is to say, the parison is obtained by compressing the plastic).

The fact that the moulding unit is a rotary machine is advantageous for two reasons:
  it guarantees uniformity of temperature of the parisons fed out and directed into the thermal conditioning unit;
  it allows the moulding unit to keep in step with the units downstream, in particular with the thermal conditioning unit, which is in turn connected to a machine which forms the containers from the parisons.

In light of this, the line comprises a blow-moulding unit configured to receive the heated parisons from the conditioning unit and to blow-mould them in such a way as to make containers (of PET) designed to be filled with liquid or semi-liquid food products (the term "semi-liquid product" is used to mean, for example, a sauce or other dense liquid, which may or may not have pieces of solid food product in it).

Again with regard to the fact that the parison moulding unit is preferably rotary and works by compression it may be observed that the parisons are warm or hot when they are made available for further processing.

That means it is recommended (or necessary, depending on circumstances) to first cool the parisons if they are not fed to the blow-moulding machine immediately and are, instead, transferred to a warehouse or storage system.

In light of this, it should be noted that the conditioning unit is configured not only to heat the parison but also to cool them.

For this purpose, the conditioning unit preferably comprises an oven and a cooling carousel interposed between the parison moulding unit and the oven.

Alternatively, the oven may be equipped with cooling means and with a switch which can be used to change the oven between a heating configuration and a cooling configuration.

The line also comprises a filling unit configured to receive the containers from the blow-moulding unit and to fill them with liquid food products (for example, beverages) or semi-liquid food products.

The line also comprises a capping unit configured to apply plastic caps, (for example by screwing) to the full containers in order to close them.

The filling unit and the capping unit may be embodied in a single machine or in different machines connected to each other.

The line preferably also comprises a moulding unit for making caps of plastic material from the plastic material in its raw form (for example, pellets).

The cap moulding unit is connected to the capping unit to feed the caps thereto.

Thus, preferably, the caps are made (from raw plastic) in the line itself.

Alternatively, the caps might be made outside the line.

In the latter case, the caps are fed directly to the capping machine. Preferably, the capping machine is equipped with sterilizing means (or sanitizing means or other suitable cleaning means) located at an infeed station in order to sterilize (or sanitize or clean) the incoming caps.

Further, the caps (including those made outside the line) might also be supplied to the storage system.

Below and in the detailed description of the preferred embodiments, reference is made, for convenience of description, to an embodiment where the line also comprises the cap moulding unit, but without thereby limiting the scope of protection of the invention. Indeed, all the technical features described for the line and not expressly related to cap moulding apply to the line of the invention regardless of whether cap moulding is performed inside or outside the line.

The line also comprises a storage system, warehouse, or other accumulation means. The storage system (or warehouse) is an automated warehouse.

The warehouse, or storage system, is configured to contain parisons and is connected to the thermal conditioning unit by way of a parison outgoing path and a parison return path. In this specification, the terms "warehouse" and "storage system" are used without distinction, individually or in combination, to denote any structure of accumulation intended for the purposes of storing products made in or used by the line of the invention. According to the invention, the warehouse is configured to also contain caps.

In light of this, the warehouse is also connected to the cap moulding unit and to the capping unit.

It should be noted that the line preferably also comprises a further moulding unit for making parisons from raw plastic, for example by injection or injection compression moulding.

In light of this, the warehouse is also connected to the further parison moulding unit to receive and store the parisons made thereby.

Preferably, the line also comprises a labelling unit configured to apply labels to the blow-moulded containers.

The labelling unit is connected to the outfeed of the blow-moulding unit and to the infeed of the filling unit, in order to label the empty containers.

Alternatively, the labelling unit might be connected to the outfeed of the capping unit, in order to label the containers after they have been filled and capped.

Preferably, the warehouse is configured to also contain empty, blow-moulded containers and is connected also to the outfeed of the blow-moulding unit and to the infeed of the filling unit (or of the labelling unit).

According to the invention, the bottling line is an integrated system where all the units are connected to each other and to the warehouse as explained above.

Preferably, all the units of the line are connected (by a positive control of the objects transferred from one unit to another) so that the objects transferred from one unit to another (parisons, containers or caps) are always in step or substantially in step.

The expression "in step" is used to mean that the number of objects feeding out of one unit is equal to the number of objects feeding into the next unit in the same interval of time.

The expression "substantially in step" is used to mean that the number of objects feeding out of one unit may differ slightly from the number of objects feeding into the next unit in the same interval of time, since the spacing between the objects along the path that connects the two units is subject to variations, but without there being an accumulation buffer system proper, that is to say, a system of storage in a dedicated station (storage or accumulation buffer).

Also, according to the invention, the connections of the units with each other, and between the units and the warehouse, are located in a controlled-atmosphere environment. More specifically, the connections located in a controlled-atmosphere environment are those between the parison moulding unit, the thermal conditioning unit, the blow-moulding unit, the filling unit, (the cap moulding unit, if any), the capping unit and the warehouse.

Preferably, the connections of the units with each other, and between the units and the warehouse, are located in a controlled-atmosphere environment. More specifically, the connections between the parison moulding unit, the thermal conditioning unit, the blow-moulding unit, the filling unit, (the cap moulding unit, if any), the capping unit and the warehouse internally define a controlled-atmosphere environment.

Thus, the bottling line defines an integrated system comprising the above mentioned units and related connections.

Preferably, the integrated system internally defines (comprises) a plurality of corresponding pressurized, interconnected spaces (chambers). This allows the parisons to be moved within the line (that is, the integrated system) while remaining in a controlled-atmosphere environment.

Preferably, the line comprises a plurality of outlet vents which operate on corresponding spaces forming part of the plurality of spaces to keep them at respective reference pressures.

Inside it, the warehouse defines a controlled atmosphere.

In the controlled atmosphere, there is (preferably) overpressure.

Preferably, in the controlled atmosphere, the environment is aseptic. In that case, sanitizing means are provided in that environment.

For that purpose, the connections between one unit and another are enclosed within ducts which delimit closed spaces within which the controlled atmosphere is created and maintained.

Thus, the bottling line defines an integrated system where the connections between the parison moulding unit, the thermal conditioning unit, the blow-moulding unit, the filling unit, the cap moulding unit, the capping unit and the warehouse, or storage system, are located in a controlled-atmosphere environment.

More specifically, the units making up the line (for example, the parison moulding unit, the thermal conditioning unit, the blow-moulding unit, the filling unit, the cap moulding unit, the capping unit and the warehouse internally define respective spaces. The connections between the units internally define respective spaces. These spaces all have a controlled atmosphere (for example, each space is under conditions of overpressure) and are in communication with each other (that is to say, they are interconnected) so that the objects handled by the line (parisons, caps and bottles) remain in a controlled-atmosphere environment at all times when they are inside the line.

Preferably, therefore, the line (that is, the integrated system) comprises a plurality of interconnected spaces (inside the units making up the line and the connections between them) inside which the objects handled by the line remain in a controlled-atmosphere environment at all times.

Thus, on all the paths along which they move in the line, the objects handled by the line remain in a controlled-atmosphere environment.

Preferably, the spaces are pressurized independently of each other (for example, at different pressures).

Alternatively, the line might comprise a sealed room containing all the units of the line and the warehouse, the controlled atmosphere being created and maintained inside the whole room.

The presence of the warehouse, together with the interconnections between the warehouse and the units of the line advantageously makes the line highly reliable and efficient.

For example, the connections between the warehouse and the thermal conditioning unit and between the warehouse and the cap moulding unit (and possibly also between the warehouse and the blow-moulding unit and the filling unit or the labelling unit) make it possible to deal with shutdowns of any one of the units making up the line, minimizing production down time and reducing the number of units that need to be stopped, while allowing the moulding units that work the plastic to remain in operation at all times (except in cases where the units to be stopped are those very units).

The two-way connection (through the agency of one outgoing conveyor and one return conveyor) between the warehouse and the thermal conditioning unit and the connections between the warehouse and the cap moulding unit and the capping unit make it possible to produce containers of a first colour and/or shape while allowing the moulding units (of the caps and parisons) to work with plastic of different colours and/or shapes.

The efficiency of the line is further increased by a management unit (for example, an electronic card or a suitably programmed processor) connected to the warehouse and to the units making up the line (and functioning as a central control unit for all the drive and movement systems) thereby creating an integrated, smart line management system, automatically controlling the warehouse and the units of the line and the interactions between them (that is, the flows of the objects transported between the line units) and adopting in every circumstance the situation which maximizes efficiency.

The fact that the line defines controlled atmosphere environments (by pressurizing and/or sanitizing them) in the warehouse and in all the zones connecting the units to each other and to the warehouse, makes it possible to achieve a particularly high level of hygiene.

In light of this, it should be noted that the warehouse preferably comprises, inside it, means for ionizing the air (for example, metal bars connected to a voltage generator and arranged in such a way as to generate an electric field), preferably in combination with a system of ventilation (for example, forced ventilation).

Thus, the warehouse is preferably pressurized (with air under pressure).

The warehouse is preferably pressurized with ionized air.

This has the advantage of reducing (or cancelling) unwanted electrostatic charges on the objects (parisons and caps and possibly also containers) stored in the warehouse.

Further, the warehouse preferably extends vertically (though it might also extend horizontally).

In that case (warehouse extending vertically), the infeed and outfeed (of the caps and parisons) into and out of the warehouse are preferably located at different heights. More preferably, the infeed is lower down (substantially at the height of the floor or surface which the warehouse or storage system rests on) and the outfeed further up.

The warehouse is equipped with an automated handling system which automatically controls the flow of objects into and out of the warehouse for storage and movement purposes.

Preferably, the automated handling system of the warehouse is connected or interfaced with the line management unit or is integrated therein.

Preferably, the warehouse is a drawer storage system, that is, it comprises a plurality of drawers.

The warehouse comprises a structure defining a plurality of housings (or slots) for the drawers. These housing are arranged in a plurality of juxtaposed columns.

The warehouse also comprises (at least) one lift having a platform (or carriage) designed to receive and move the drawers.

The lift platform is movable vertically (varying its height from the warehouse floor) and horizontally, in a longitudinal direction at right angles to the vertical direction.

More specifically, the (at least one) lift is configured in such a way that the platform is movable adjacently to all the housings in the warehouse in order to withdraw or insert drawers from and into the housings.

Preferably, the warehouse comprises a drawer washing station. The warehouse preferably also comprises a drawer drying station.

The warehouse also comprises at least one loading bay and at least one unloading bay for the objects stored in the warehouse.

The loading and unloading bays are accessible from the lift.

The loading and unloading bays are located in zones of the warehouse adjacent the conveyors designed to transport the objects into and out of the warehouse (respectively) and constituting the connections between the warehouse and the other units of the line.

The loading and unloading bays are equipped with respective manipulators (automatic handling means) for picking up and moving the objects stored in the warehouse.

More specifically, the manipulator of the loading bay is configured to pick up objects from at least one of the conveyors and to place them in at least one drawer (empty and waiting to be filled) positioned in the loading bay.

The manipulator of the unloading bay is configured to pick up objects from at least one drawer (full and waiting to be emptied) positioned in the loading bay and to place them on at least one of the conveyors.

The lift moves within the warehouse (driven by the control unit) between the loading bay, the housings in the warehouse and the unloading bay, in such a way as to carry empty drawers to the loading bay, pick up full drawers from the loading bay, carry full drawers to the unloading bay and pick up empty drawers from the unloading bay and to insert full drawers into the housings and withdraw empty drawers from the housings of the warehouse.

Preferably, the warehouse comprises sterilizing means located in the unloading bay and operating on the objects in transit through the unloading bay (leaving the warehouse) in order to sanitize them.

In addition (or alternatively), the warehouse comprises sterilizing means located in the loading bay and operating on the objects in transit through the loading bay (entering the warehouse) in order to sanitize them.

Preferably, the interior of the warehouse is an aseptic (that is, sterile) environment. In light of this, the warehouse comprises sterilizing means for sterilizing the space inside the warehouse.

These sterilizing means comprise, for example, UV ray sources or nozzles configured to spray a sterilizing fluid.

In the loading bay and/or in the unloading bay, the warehouse preferably comprises a system for checking and rejecting the objects. This checking and rejection system comprises, for example, an optical detector connected to a processor.

In the loading bay and/or in the unloading bay, the warehouse preferably comprises a system for counting the objects (inserted into or withdrawn from the drawers). This counting system comprises, for example, a video camera connected to a processor.

In the loading bay and/or in the unloading bay, the warehouse preferably comprises a system for weighing the objects. This weighing system comprises, for example, a loading cell or other known weighing means.

Preferably, the warehouse comprises a system of outlet vents (for example connected to fans) located in a high-pressure zone of the warehouse.

Preferably, the warehouse also comprises a system of inlet vents (for example connected to fans) located in a low-pressure zone of the warehouse.

The pressure in the low-pressure zone is lower than that in the high-pressure zone but preferably higher than the pressure outside the warehouse (outside the bottling line).

Preferably, the high- and low-pressure zones of the warehouse are located at opposite ends of the warehouse, so as to create a (laminar) flow of air through the entire space inside the warehouse.

Preferably, the drawers are provided with holes to allow an air flow to pass through them.

Preferably, the warehouse structure defining the drawer housings is a structure (for example, a lattice frame) defining openings through which an air flow can pass.

Preferably, the warehouse has the shape of a parallelepiped.

Preferably the warehouse has a rectangular base, with two long sides and two short sides. The warehouse accordingly has a lateral wall with two large faces and two small faces.

Preferably, the high- and low-pressure zones are located at opposite faces of the lateral wall of the warehouse, preferably the small faces of the lateral wall.

Preferably, the warehouse comprises a plurality of filters coupled to the outlet vents (downstream of the corresponding pressure fans) to filter the air delivered into the warehouse.

It should be noted that the ducts which enclose the connections between one unit and another of the line are kept at a pressure which is higher than the pressure outside the line.

Preferably, the line comprises outlet vents located in at least one limited stretch of the duct which encloses a connection (this applies to one connection and preferably to all the connections).

That way, inside the ducts enclosing the connections there are zones at a high pressure and zones at a (relatively) low pressure (where, however, the pressure is higher than it is outside the line).

Preferably, the ducts which enclose the connections at an internal pressure which is lower than that of the warehouse, especially in the stretches of the ducts connected to the warehouse.

Preferably, the ducts which enclose the connections at an internal pressure which is lower than that of the units which they connect, especially in the stretches of the ducts connected to the units.

That way, the bottling line defines a sealed system of interconnected chambers and ducts defining an internal space which is pressurized relative to a room in which the line is installed.

Within this sealed system of chambers and ducts there are zones where the pressure is relatively high and zones where the pressure is relatively low.

The different pressure zones within the sealed system of chambers and ducts are determined by the position of the outlet vents (or other pressurizing means of known type) located in the line.

The presence of different pressure zones within the sealed system of chambers and ducts determines air flows having predetermined directions within the line (that is, within the sealed system of chambers and ducts).

Preferably, the lift is movable within the warehouse along rails which follow a predetermined path.

Preferably, the lift is coupled to the rails by rolling elements. This reduces the formation of dust or other material in suspension inside the warehouse.

As regards the arrangement of the rails, that is to say, of the path followed by the lift in the warehouse, attention is drawn to the following.

Preferably, the lift carriage is movable vertically, preferably for the full height of the warehouse (that is, its vertical stroke is equal to the height of the warehouse).

Also, preferably, the lift carriage is movable horizontally, preferably along the direction of the long sides of the warehouse base (that is, its horizontal stroke is equal in length to the long sides of the rectangular base of the warehouse).

In light of this, there are different embodiments.

In a first embodiment, the warehouse includes an empty passage which cuts the small lateral faces and separates the warehouse into two parts along a dividing plane parallel to the large lateral faces.

The lift comprises a frame having two vertical uprights (whose length is equal to the height of the warehouse) which define vertical guide rails for opposite ends of the carriage (which is a substantially rectangular platform).

The frame is in turn movable horizontally along a (horizontal,) direction parallel to the large faces. The frame runs on horizontal rails or on a single horizontal rail extending along the dividing plane.

In this case, the carriage and the drawers are positioned perpendicularly to the planes defined by the small lateral faces of the warehouse.

In a second embodiment, the carriage and the drawers are positioned parallel to the planes defined by the small lateral faces of the warehouse.

The warehouse includes at least one empty passage (vertical aisle) which cuts the large lateral faces and separates the warehouse into two or more parts along a dividing plane parallel to the small lateral faces.

For example, the warehouse might have a plurality of empty passages (vertical aisles) which cut the large lateral faces and separate the warehouse into a plurality of parts along dividing planes parallel to the small lateral faces.

The warehouse also comprises slideways for the lift carriage extending horizontally inside the warehouse, to allow the lift carriage to move horizontally inside the warehouse.

For example, at one or more predetermined levels (that is, at one or more predetermined heights from the warehouse floor) there might be slideways for the lift carriage extending horizontally for the full length of the warehouse (measured along the long sides of the rectangular base of the warehouse).

Preferably, the horizontal slideways are located at the lowest level or at the highest level (or at an intermediate level, that is, half way up the warehouse).

Each of the vertical aisles (positioned transversely to the large lateral faces) has vertical slideways to allow the carriage to move vertically up and down these aisles.

When the carriage is aligned with the horizontal slideways, it is able to move horizontally from one vertical aisle to another.

It should be noted that the structure of the storage system might also by divided into a plurality of blocks (or modules) movable relative to each other to open and close the free passages between one block and another. These passages define vertical and/or horizontal aisles to move the lift (that is, the lift carriage) within the storage system. In this situation, therefore, the at least one vertical and/or horizontal aisle is created dynamically by moving the blocks. Moreover, they may be formed (opened and closed) anywhere in the warehouse.

Thanks to this structure, the difference between the total volume of the space inside the warehouse and the volume of the space occupied by the drawers inside the warehouse is limited to the volume of a single horizontal aisle and a single vertical aisle.

This maximizes the space inside the warehouse, reducing its overall dimensions (relative to the number of drawers, that is, product storage space).

In light of this, the warehouse drawers are organized in vertical stacks. The stacks are slidably coupled to a warehouse base so that they can be moved horizontally.

Drive means (for example, electric motors or other actuators) for the blocks are connected to a control unit (for example, an electronic card) designed to control and manage the warehouse.

The control unit is set up to receive as input a signal representing the position of the lift carriage and the position (of the housing, that is, the drawer) inside the warehouse which the carriage must reach. The control unit is programmed to process and output a signal for driving the drawer block movement means, to form a path (one vertical and one horizontal aisle or a succession of horizontal and vertical stretches of aisle) which places the carriage in communication with the position to be reached.

The drawers can also be moved vertically relative to each other (individually or in blocks) in order to dynamically create horizontal aisles (or parts of aisles) along which to move the lift carriage.

The continuous cycle container bottling method according to the invention comprises the following steps:
  moulding parisons from thermoplastic material in raw form;
  thermally conditioning the parisons by the heating and cooling thereof;
  blow-moulding the heated parisons in order to make containers of thermoplastic material;
  filling the containers with liquid or semi-liquid food products;
  possibly, moulding caps from plastic material in raw form;
  capping the full containers;
  setting up a warehouse configured to contain the parisons.

According to the invention, the warehouse defines inside it a controlled atmosphere environment and is configured to also contain caps.

Further, the units of the line and the warehouse constitute a bottling line which defines an integrated system where the movements by which the parisons (and the bottles and caps) are transferred from one unit to another (the warehouse, or storage system, being one of the units) are carried out in a controlled-atmosphere environment. Preferably, this environment is defined inside the line by a plurality of interconnected spaces (preferably pressurized).

More specifically, the transfer movements at least between the warehouse, the thermal conditioning unit (for parisons, and possibly also for caps) occur in a controlled-atmosphere environment.

BRIEF DESCRIPTION OF THE DRAWINGS

This and other features of the invention will become more apparent from the following detailed description of a preferred, non-limiting embodiment of it, with reference to the accompanying drawings, in which:

FIG. 3 illustrates a detail representing the thermal conditioning unit of the line of FIG. 1;

FIG. 4 shows the conditioning unit of FIG. 3 in a variant embodiment;

DETAILED DESCRIPTION OF PREFERRED EMBODIMENTS OF THE INVENTION

Figure 1:
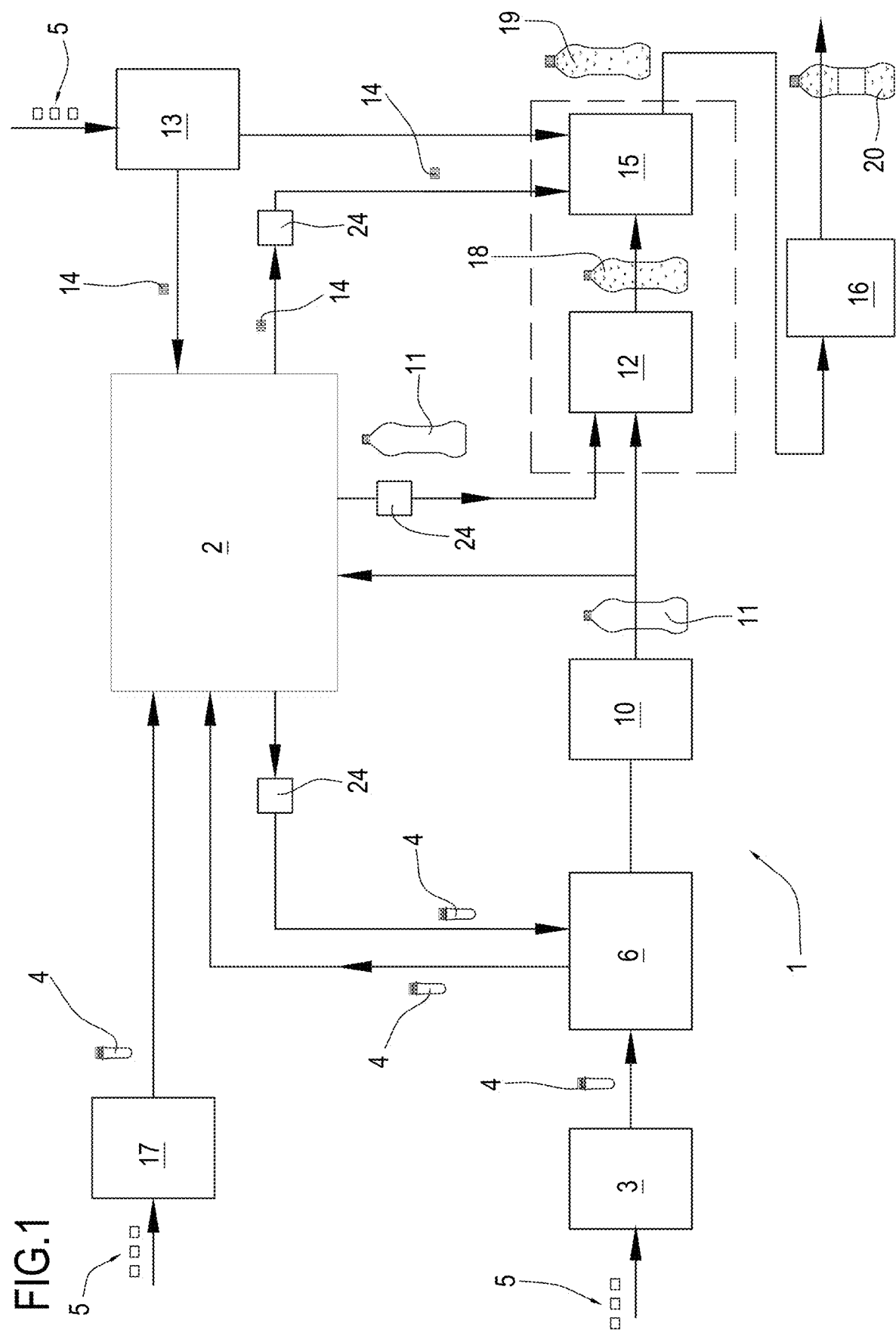
FIG. 1 is a functional diagram representing a bottling line according to this invention.

The numeral 1 in the drawings denotes a line (or plant) for bottling containers of thermoplastic material in continuous cycle.

The line 1 comprises a moulding unit 3 for making parisons 4 of thermoplastic material from the thermoplastic material in its raw form (for example, pellets 5 of raw, coloured plastic).

Preferably, the parison 4 moulding unit 3 is a rotary machine and, preferably, it works the plastic by compression.

The moulding unit 3 is described in detail in patent document WO2006092651 in the name of the same Applicant as this invention and incorporated herein by reference insofar as concerns the description of the rotary moulding machine.

The line 1 comprises a thermal conditioning unit 6 for the parisons 4.

The conditioning unit 6 is configured to receive the parisons from the moulding machine 3 and to heat the parisons 4.

The conditioning unit 6 is also configured to cool the parisons 4.

The conditioning unit 6 is configured in such a way that the parisons 4 can be cooled and heated simultaneously or, alternatively, at different times.

In light of this, it should be noted that two variant embodiments are envisaged for the conditioning unit 6.

In a first variant embodiment, illustrated in FIG. 3, the thermal conditioning unit 6 comprises a heating sub-unit 7 and a cooling sub-unit 8.

The heating sub-unit 7 comprises, for example, an oven defining a predetermined path for the parisons within a passage where heating elements are arranged (according to a solution of per se known type and not illustrated in detail).

The cooling sub-unit 8 comprises, for example, a carousel 9.

The carousel 9 is described in detail in patent document WO2009127962 in the name of the same Applicant as this invention and incorporated herein by reference insofar as concerns the description of the cooling carousel.

In a second variant embodiment, illustrated in FIG. 4, the thermal conditioning unit 6 comprises only the oven 7.

In this case, in addition to the heating means, the oven 7 also comprises cooling means which can be operatively activated along at least one stretch of the path followed by the parisons 4 in the oven 7.

The oven can be switched between a cooling configuration (where the heating means are off or on low heat and the cooling means are on) and a heating configuration (where the heating means are on and the cooling means are off).

The selfsame oven 7 can also heat and cool different parisons 4 simultaneously. In that case (not illustrated in the drawings), the heating means are located in a first portion of the oven 7 and the cooling means in a second portion of the oven 7. For example, the first and second portions might be arranged on two levels (the heating means below and the cooling means above, or vice versa) or on consecutive stretches of the oven (first a cooling stretch, followed by a heating stretch).

The line 1 also comprises a blow-moulding unit 10, comprising a rotary blow-moulding machine in turn comprising a plurality of moulds arranged on a carousel (according to a technique known in the trade, not illustrated).

The blow-moulding unit 10 is configured to receive the heated parisons 4 from the conditioning unit 6 and to blow-mould them into the moulds in such a way as to make containers 11 (bottles or other PET containers) designed to be filled with liquid or semi-liquid food products.

The numeral 11 in the drawings denotes the blow-moulded empty containers made available as they feed out of the blow-moulding unit 10.

The line 1 comprises a filling unit 12 configured to fill the containers 11 with liquid or semi-liquid food products (according to a technique of per se known type, not illustrated in the drawings).

The line 1 comprises a moulding unit 13 for making plastic caps 14 from plastic material in its raw form (according to a technique of per se known type).

The line 1 comprises a capping unit 15 configured to apply the caps 14 to the containers 11 filled in the filling unit 12.

The capping unit 15 is constructed according to a technique of per se known type and is not illustrated in the drawings.

The line 1 preferably comprises a labelling unit 16 configured to apply labels to the containers 11 according to a technique of per se known type.

The line 1 preferably comprises a further parison moulding unit 17 comprising a moulding machine (of non-rotary type) which works by injection or by injection and compression).

It should be noted that the line comprises at least one parison moulding unit (for example, the one labelled 3 in the drawings or the one labelled 17 in the drawings). The at least one parison moulding unit may be of any kind, for example, rotary or non-rotary.

Preferably, the line comprises (at least) two parison moulding units (for example, the ones labelled 3 and 17 in the drawings). In that case, the line preferably comprises a rotary parison moulding unit 3 and a non-rotary parison moulding unit 17.

Preferably, the filling unit 12 comprises a rotary machine.

Preferably, the capping unit 15 comprises a rotary machine.

Preferably, the labelling unit 16 comprises a rotary machine.

Preferably, the units making up the line 1 (in particular, the parison moulding unit 3, the thermal conditioning unit 6, the blow-moulding unit 10, the filling unit 12, the capping unit 15 and the labelling unit 16) are connected to each other in such a way that the products—namely, parisons containers and caps—are transferred from one unit to another substantially in step with each other during the operation of the line.

In the drawings, the numeral 18 denotes the containers when full, uncapped and unlabelled, the numeral 19, the containers when full, capped but unlabelled, the numeral 20, the containers when full, capped and labelled, the numeral 21, the containers when empty and labelled but uncapped, and the numeral 22, the containers when full and labelled but uncapped.

The line 1 comprises a warehouse 2.

The warehouse 2 is configured to contain the parisons 4 and the caps 14.

The warehouse 2 is preferably configured to also contain the empty, blow-moulded containers 11.

The warehouse is interconnected with the units of the line 1 through the connections described below.

The warehouse 2 is connected to the conditioning unit 6 through a conveyor 23 designed to transfer the parisons 4 from the warehouse 2 to the conditioning unit 6 (and more specifically, to the sub-unit 7).

Along the path of the parisons 4 from the warehouse 2 to the conditioning unit 6 there is an orienting device 24 configured to orient and suitably space the parisons 4 through the agency of manipulating means (according to a substantially known technique).

It should be noted that the orienting device 24 may be built into the warehouse 2 or built into the conditioning unit 6 or it may be inserted in the conveyor 23 (the latter embodiment being the one illustrated in the drawings).

This applies to all the conveyors and to all the related orienting devices described below. It should be noted that all the orienting devices are denoted by the reference numeral 24, whether they are used to orient the parisons, the caps or the containers.

The warehouse 2 is connected to the conditioning unit 6 through a further conveyor 25 designed to transfer the parisons 4 from the conditioning unit 6 (and more specifically, from the sub-unit 8) to the warehouse 2.

The warehouse 2 is connected to the cap 14 moulding unit 13 through a conveyor 26 designed to transfer the caps 14 from the cap moulding unit 13 to the warehouse 2.

The cap 14 moulding unit 13 is connected to the capping unit 15 through a conveyor 27 designed to transfer the caps 14 from the cap moulding unit 13 to the capping unit 15. Inserted in this connection there is an orienting device 24.

The parison moulding unit 3 is connected directly (for example, by one or more transfer carousels) to the conditioning unit 6.

The conditioning unit 6 is connected directly (for example, by one or more transfer carousels) to the blow-moulding unit 10.

The blow-moulding unit 10 is connected (for example by one or more transfer carousels or by other conveyors, preferably provided with positive control of the containers 11) to the filling unit 12.

The filling unit 12 and the capping unit 15 are defined on a single machine (preferably a rotary machine) or on two distinct machines connected directly to each other (for example by one or more transfer carousels).

Preferably, the warehouse 2 is connected to the further parison 4 moulding unit 17 through a conveyor 28 designed to transfer the parisons 4 from the further moulding unit 17 to the warehouse 2.

Preferably, the warehouse 2 is connected to the blow-moulding unit 10 through a conveyor 29 designed to transfer the containers 11 from the blow-moulding unit 10 to the warehouse 2.

Preferably, the warehouse 2 is connected to the blow-moulding unit 10 through a conveyor 30 designed to transfer the containers 11 from the warehouse 2 to the blow-moulding unit 10. Inserted in this connection there is an orienting device 24.

Preferably, the warehouse 2 is connected to the filling unit 12 (or to the labelling unit etichettatrice 16) through a conveyor 31 designed to transfer the containers 11 from the warehouse 2 to the filling unit 12 (or to the labelling unit etichettatrice 16). Inserted in this connection there is an orienting device 24.

According to the invention, the warehouse 2 defines inside it a controlled atmosphere environment.

The expression "controlled atmosphere environment" is used to mean a pressurized environment (overpressure) or an environment in which there is forced circulation of a predetermined gas.

It should be noted that according to the invention, the line 1 defines an integrated system where the connections of the units with each other and between the units and the warehouse 2, as described above, are located in a controlled-atmosphere environment.

More specifically, the connections located in a controlled-atmosphere environment are at least those between the parison moulding unit 3, the thermal conditioning unit 6, the blow-moulding unit 10, the filling unit 12, the cap moulding unit 13, the capping unit 15 and the warehouse 2.

The controlled-atmosphere environment in the connections of the units of the line 1 with each other and between the selfsame units and the warehouse 2 are made according to two variant embodiments.

In a first variant embodiment, the conveyors 23, 25-31 and the other connections between the units (as described above) are housed inside ducts (not illustrated) which define sealed chambers in which the controlled atmosphere is created and maintained.

In a second variant embodiment, the line comprises a room (not illustrated) containing the warehouse 2 and all the units making up the line 1. The room defines a single sealed chamber in which the controlled atmosphere is created and maintained.

Preferably, the line 1 comprises sterilizing (or sanitizing) means operating on the controlled atmosphere environment to make the environment in the chamber aseptic.

Preferably, the warehouse 2 is internally pressurized with ionized gas.

For example, the line 1 comprises an ionizing station (not illustrated), having:
electrodes connected to a medium- or high-voltage generator to produce an electric field (preferably the tips of the electrodes generate a corona effect) in a spatial region; and
a forced circulation of gas (for example, air) to generate a flow across the spatial region covered by the electric field.

The ionizing station is coupled to the warehouse 2 in order to ionize the environment inside the warehouse 2.

The line 1 preferably also comprises a management unit.

The management unit comprises, for example, an electronic card or a suitably programmed processor or like processing means, and is not illustrated in the drawings.

The management unit is preferably connected to the warehouse 2 and to all the units making up the line 1 in such a way as to control and/or monitor the line as a whole.

In particular, the management unit is connected to the warehouse 2, to the thermal conditioning unit 6, to the cap moulding unit 13 and to the capping unit 15. In light of this, the management unit is programmed to control the warehouse 2 and these units according to (one or more of) the following operating configurations:

- the thermal conditioning unit 6 is in parison 4 heating mode and feeds the blow-moulding unit 10;
- the thermal conditioning unit 6 is in parison 4 cooling mode and feeds the warehouse, or storage system 2; this configuration is adopted in the event of a shutdown of the blow-moulding unit 10 or when the blow-moulding unit 10 is fed with parisons differing in colour from those being produced by the parison 4 moulding unit 3;
- the cap 14 moulding unit 13 feeds the capping unit 15; this operating configuration is set by default when the cap 14 moulding unit 13 and the capping unit 15 are both operating and working with objects of the same colour;
- the cap 14 moulding unit 13 feeds the warehouse, or storage system 2;

this configuration is adopted in the event of a shutdown of the capping unit 15 or when the capping unit 15 is fed with caps 14 differing in colour from those being produced by the cap 14 moulding unit 13.

It should be noted that the management unit is configured in such a way that these configurations can be activated alternatively or in combination with each other.

Also, preferably, the management unit is programmed to control the warehouse 2 and the units of the line according to (one or more of) the following operating configurations (the management unit being configured in such a way that these configurations can be activated alternatively or in combination with each other):

- the cooling sub-unit 8 is off, while the heating sub-unit 7 is on and receives the parisons from the parison moulding unit and feeds them to the blow-moulding unit; this operating configuration is set by default when the parison 4 moulding unit 3 and the blow-moulding unit 10 are both operating and working with objects of the same colour;
- the cooling sub-unit 8 is on and receives the parisons 4 from the parison moulding unit 3 and feeds them to the warehouse 2, while the heating sub-unit 7 is on and receives other parisons 4 from the warehouse 2 and feeds them to the blow-moulding unit 10; this operating configuration is set when the parison 4 moulding unit 3 and the blow-moulding unit 10 are both operating but working with objects of different colours and/or shapes;
- the cap moulding unit 13 feeds the warehouse 2, while the warehouse feeds the capping unit 15; this operating configuration is set when the cap 14 moulding unit 13 and the capping unit 15 are both operating but working with objects of different colours.

Also, preferably, the management unit is programmed to control the warehouse 2 and the units of the line according to the following operating configurations (the management unit being configured in such a way that these configurations can be activated alternatively or in combination with each other):

- the blow-moulding unit 10 feeds the filling unit 12 with the containers 11;
- the blow-moulding unit 10 feeds the warehouse 2 with the containers 11;
- the warehouse 2 feeds the filling unit 12 with the containers 11.

These operating conditions make it possible to deal with a machine shutdown of the blow-moulding unit 10 or of the filling unit 12 according to a logic similar to that described above.

Figure 2:
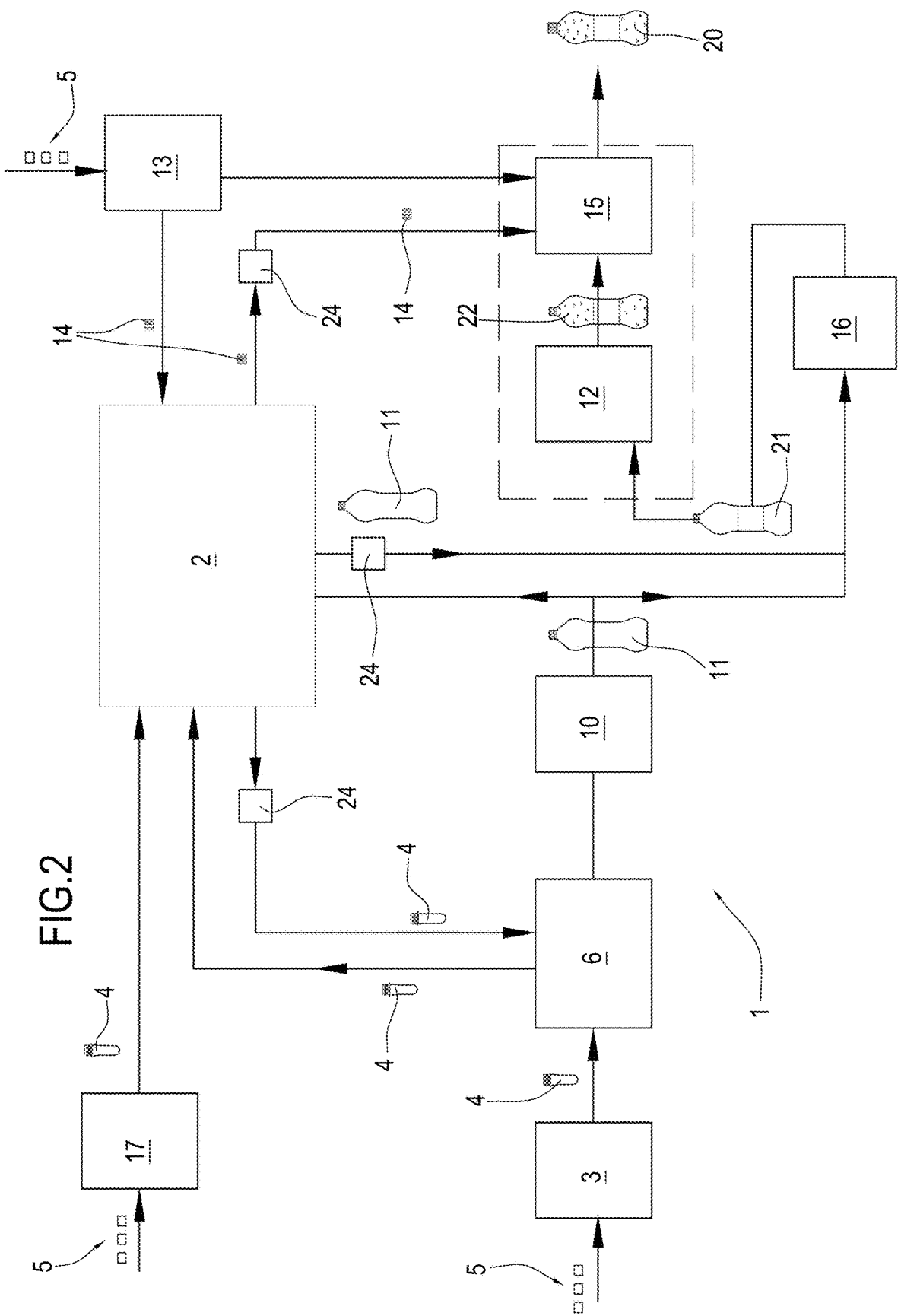
FIG. 2 shows the line of FIG. 1 in a variant embodiment of the connection of the labelling unit.
Figure 5:
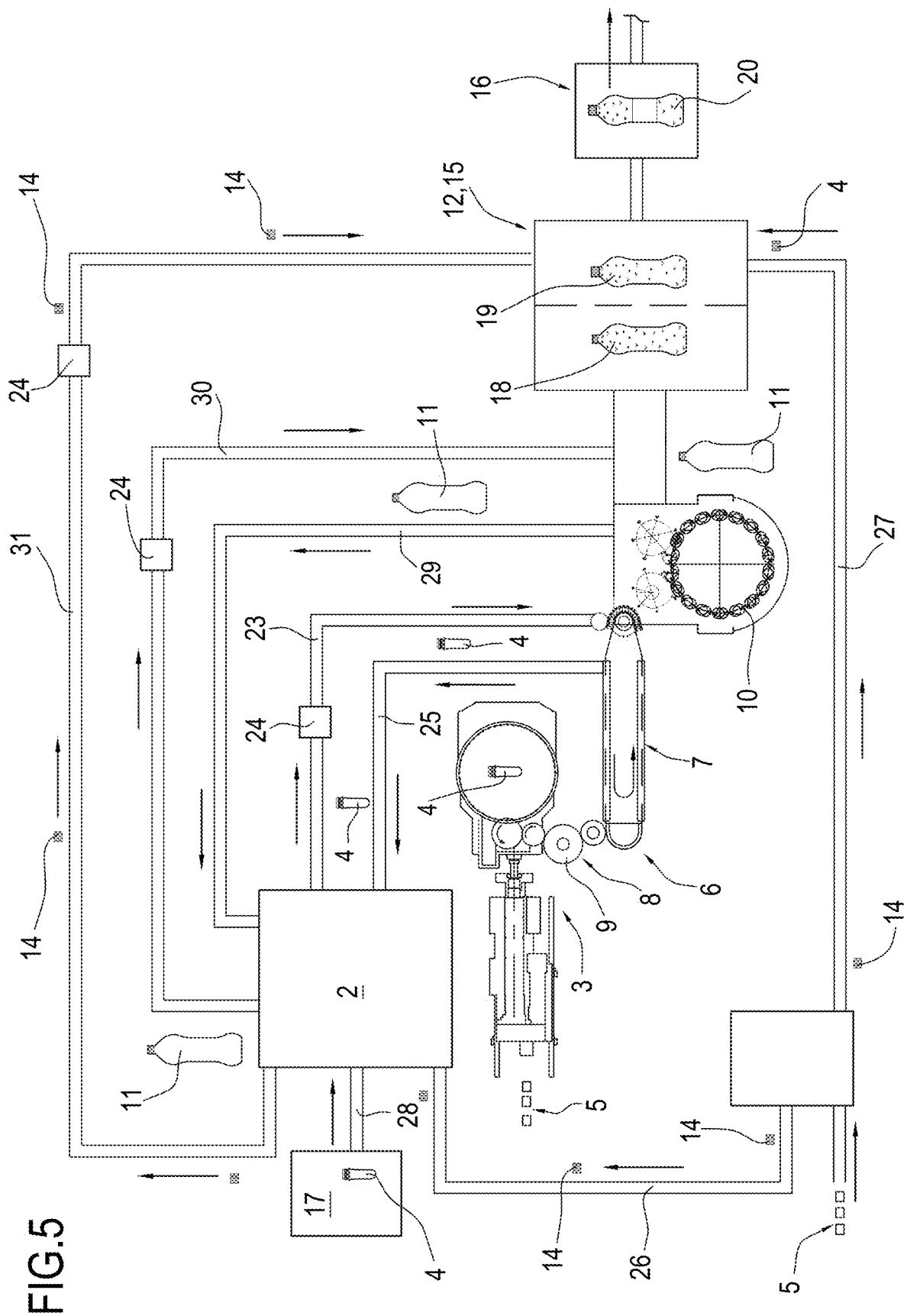
FIG. 5 is a schematic plan view of the line of FIG. 1.

Also, preferably, the management unit is programmed to control the warehouse 2 and the units of the line according to an operating configuration where the warehouse 2 feeds the labelling unit 16 with the containers 11 and the labelling unit 16 feeds the filling unit 12 with the labelled containers 21 (with reference to FIG. 2).

As regards the warehouse, or storage system 2, attention is drawn to the following.

The warehouse 2 comprises a structure 201 constituting a warehouse frame (for example, a metal lattice frame).

The structure 201 defines a plurality of housings (or slots) for respective drawers 202 (only partly illustrated).

The drawers 202 can be accommodated in the housings and are designed to contain objects, such as, for example, parisons, caps or bottles.

Preferably, the structure 201 is configured to define a plurality of juxtaposed columns. Each column comprises a plurality of vertically aligned housings.

The warehouse also comprises a lift 203 having a platform 204 designed to receive and move the drawers 202.

The lift platform 204 is movable vertically on vertical guide rails 205.

The lift platform 204 is also movable horizontally.

Preferably, the movements of the lift 202, that is, of the platform 204, occur through the agency of rolling elements 212. For example, the lift 202 is slidably coupled to the structure 201 by wheels 212 (or other rolling elements). Preferably, the platform 204 is coupled to a lift frame 12 or directly to the structure 201 through the agency of wheels 212 (or other rolling elements).

The combination of the vertical and horizontal movements of the platform allows the platform 204 to reach all the housings in the warehouse, that is, all the drawers housed in the housings in the warehouse.

The platform 204 is configured to withdraw a drawer 202 from a housing and to insert a drawer into an empty housing.

Preferably, the platform 204 is configured to transport two or more drawers 202 at a time.

Preferably, the warehouse 2 comprises a drawer 202 washing station (or bay) 206.

The warehouse 2 preferably also comprises a drawer drying station (not illustrated).

Preferably, the warehouse 2 comprises a system of outlet vents 207 (for example connected to fans). The outlet vents 207 comprise fans or other means configured to generate an air flow.

The outlet vents 207 are located in a zone of the warehouse 2 which is therefore a high-pressure zone of the warehouse 2.

The outlet vents 207 are oriented in a predetermined direction, towards a low-pressure zone of the warehouse 2.

Figure 10:
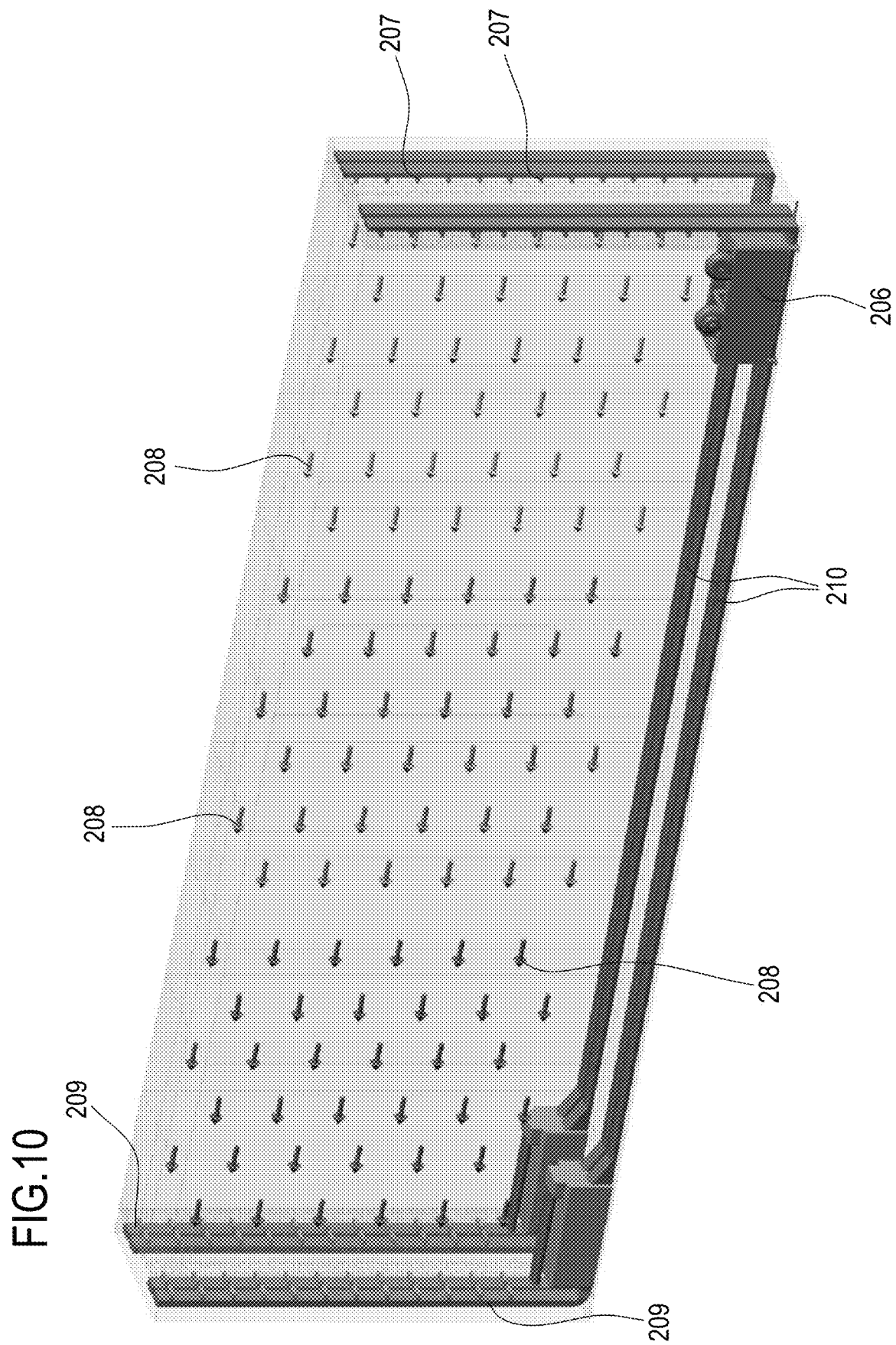
FIG. 10 shows the warehouse of FIG. 7 in a transparent, functional view.

Preferably, the high- and low-pressure zones of the warehouse are located at opposite ends of the warehouse 2, so as to create a (laminar) flow of air through the entire space inside the warehouse 2. This flow is represented by the arrows 208 in FIG. 10.

The warehouse 2 also comprises a system of inlet vents 209 (for example connected to fans) located in the low-pressure zone of the warehouse.

The pressure in the low-pressure zone is lower than that in the high-pressure zone but higher than the pressure of the environment outside the warehouse (that is, outside the bottling line; typically, this environment is a room in which the line is installed).

Preferably, the drawers 202 are provided with holes to allow an air flow to pass through them.

Preferably, the structure 201 is internally provided with a plurality of holes or openings oriented in the same direction as the outlet vents 207 are oriented, so as to allow the air flow to move easily in the space inside the warehouse 2.

Thus, the drawer housings have holes in them (for example, they are defined by grids).

Preferably, the system of outlet vents 207 and inlet vents 209 are connected to ducts 210 to form a recirculating air flow inside the warehouse 2 (in a closed circuit).

Preferably, the warehouse comprises a plurality of filters (not illustrated) coupled to the outlet vents (downstream of the corresponding pressure fans) to filter the air delivered into the warehouse 2.

Preferably the warehouse has the shape of a parallelepiped and has a rectangular base, with two long sides and two short sides. The warehouse accordingly has a lateral wall with two large faces and two small faces.

Preferably, the high- and low-pressure zones are located at opposite faces of the lateral wall of the warehouse, This allows the air to flow through the whole of the warehouse.

Preferably, the high- and low-pressure zones are located on the small faces of the lateral wall. This allows minimizing the number of outlets/inlets 207, 209, thus simplifying warehouse construction.

As regards the internal configuration of the warehouse, there are different embodiments for the arrangement of the drawer housings and the path followed by the lift in the warehouse: two examples are described below.

Figure 7:
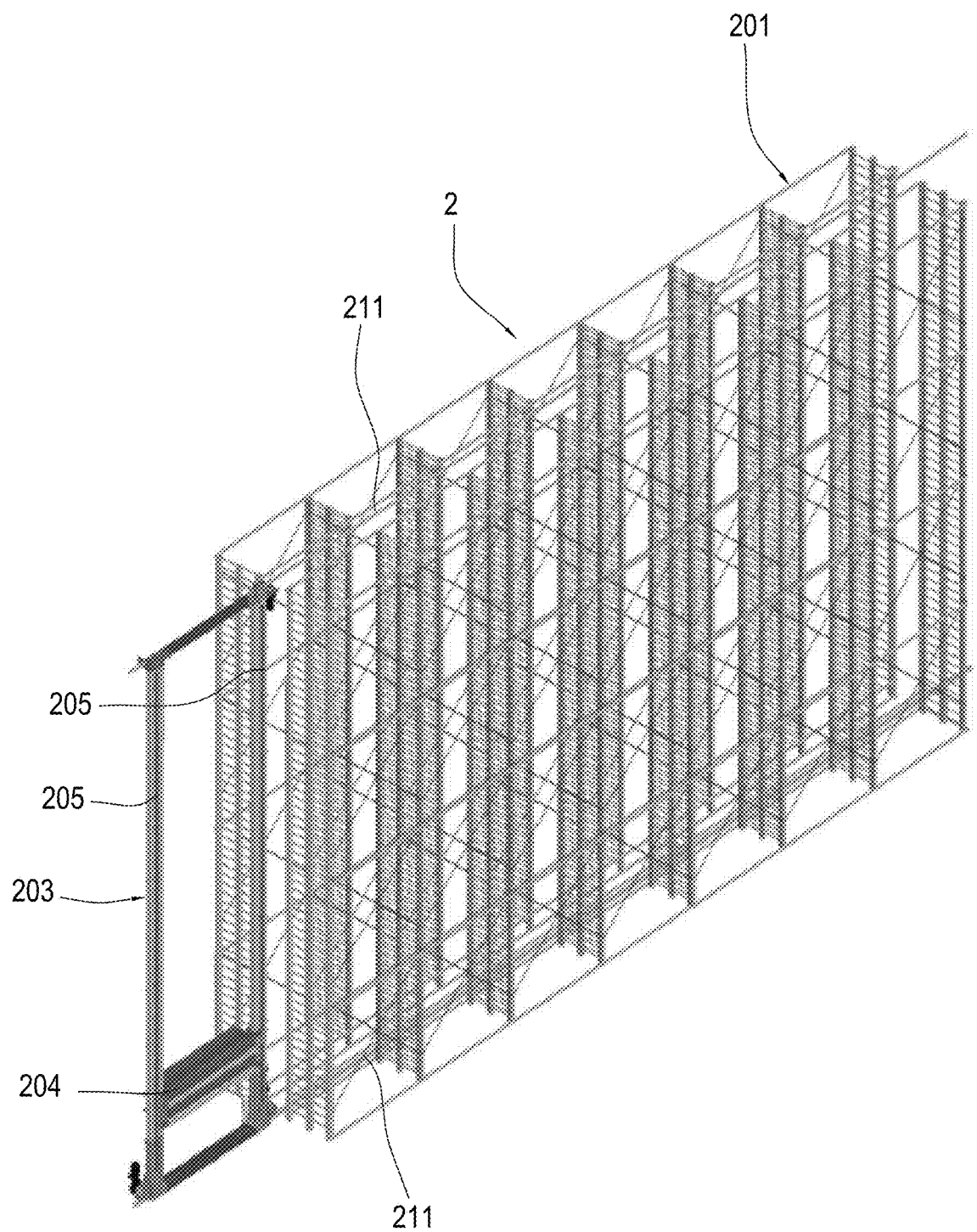
FIG. 7 is a schematic perspective view of the warehouse of the line of FIG. 1.
Figure 8:
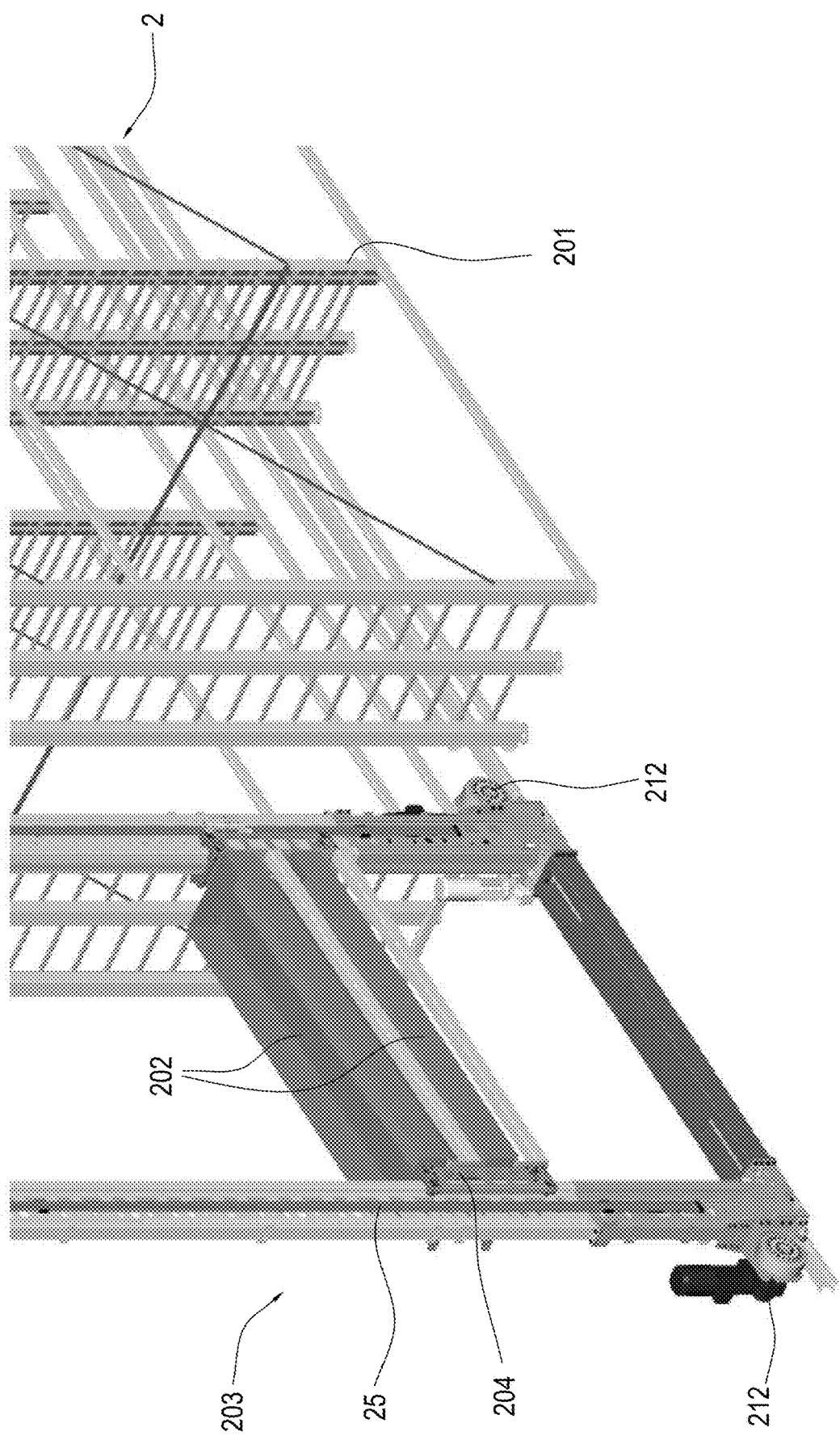
FIG. 8 shows an enlargement of a detail from FIG. 7
Figure 9:
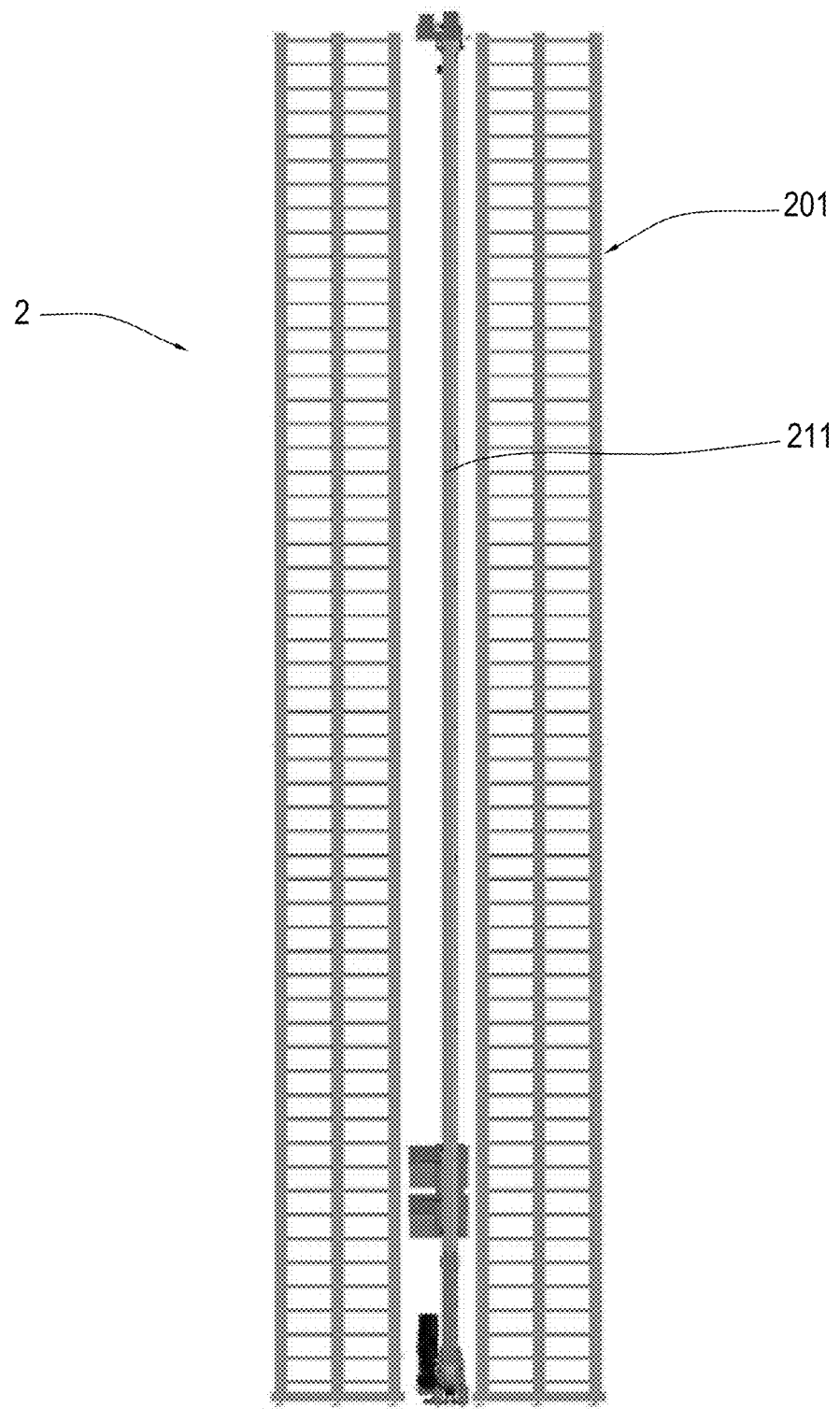
FIG. 9 is a plan view of the warehouse of FIG. 7.

In a first embodiment (illustrated in FIGS. 7-9), the warehouse 2 includes an empty passage which cuts the small lateral faces and separates the warehouse into two parts along a dividing plane parallel to the large lateral faces.

The lift 203 comprises a frame having two vertical uprights (whose length is equal to the height of the warehouse) which define the vertical guide rails 205. The uprights are slidably coupled to opposite ends of the carriage 204.

Preferably, the lift frame has the shape of the perimeter of a rectangle since the vertical uprights are closed by crossbars at the ends of them.

The lift (that is, the lift frame) is movable horizontally along a (horizontal,) direction parallel to the large faces. The frame runs on horizontal guides, that is on horizontal rails 211, extending along the dividing plane.

In this case, the carriage 204 and the drawers 202 are positioned perpendicularly to the planes defined by the small lateral faces of the warehouse (and parallel to the large lateral faces).

In a second embodiment (illustrated in FIG. 6), the carriage 204 and the drawers 202 are positioned parallel to the planes defined by the small lateral faces of the warehouse.

Inside it, the warehouse 2 has a plurality of empty passages (vertical aisles) which cut the large lateral faces and separate the warehouse into a plurality of parts along dividing planes parallel to the small lateral faces.

At one or more predetermined levels (that is, at one or more predetermined heights from the warehouse floor) there are (horizontal) slideways for the lift carriage.

These horizontal slideways for the carriage 204 define one or more horizontal aisles along which the carriage 204 can move. The at least one horizontal aisle for the movement of the carriage 204 is preferably located at the highest level of the warehouse (near the warehouse ceiling) or at the lowest level (near the warehouse floor).

It should also be noted that the ducts which enclose the connections between one unit and another of the lie are also kept at a pressure which is higher than the pressure outside the line. These connections correspond to the conveyors 23, 25-31 described above.

Figure 6:
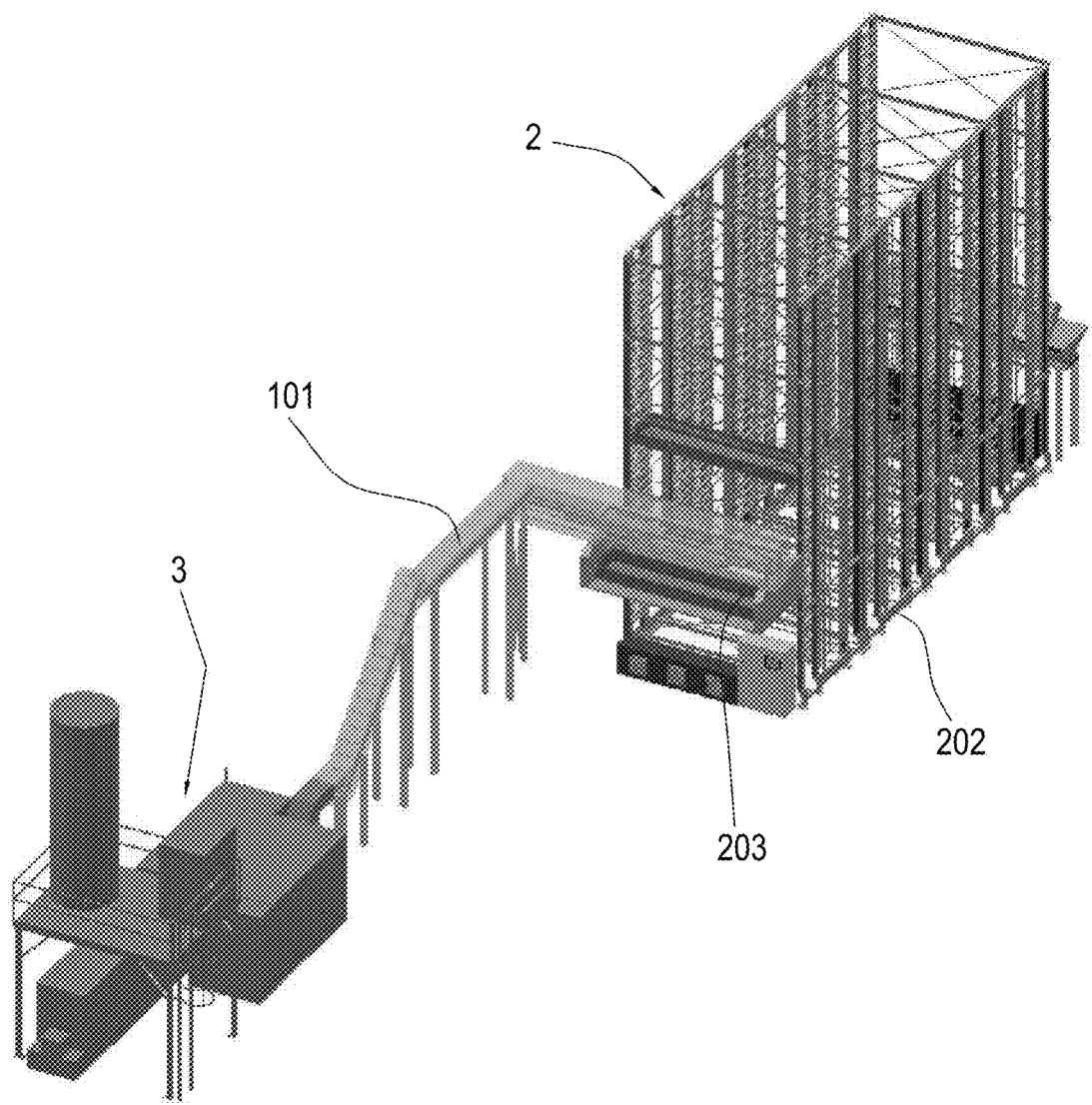
FIG. 6 is a schematic perspective view of a part of the line of FIG. 1.

By way of an example, FIG. 6 shows a duct 101. The duct 101 connects the further parison moulding unit 17 to the warehouse 2.

Preferably, the line comprises outlet vents (not illustrated) located in zones (limited stretches) of the ducts which enclose the conveyors, that is, the connections between the different units making up the line.

Thus, the line defines a sealed space within the line itself, which is kept at a higher pressure than in the environment outside the line (that is, the environment in the room where the line is installed).

This solution allows saving of energy and is a better guarantee against contamination than a solution where the entire room in which the line is installed is pressurized.

Preferably, the line connecting ducts are kept at a predetermined internal pressure and the pressure is distributed in a predetermined manner to define zones where the pressure is relatively high and zones where the pressure is relatively low thanks to the location of outlet vents at predetermined positions (zones) of the ducts of the line.

This determines an air flow at a controlled pressure within the ducts (and between the machines and units making up the line, including the warehouse 2, and the ducts).

This invention also provides a continuous cycle method for bottling containers of thermoplastic material.

The method comprises the following steps:
moulding parisons 4 from thermoplastic material 5 in raw form;
thermally conditioning the parisons 4 by the heating and (if necessary) cooling thereof;
blow-moulding the heated parisons 4 in order to make containers 11 of thermoplastic material (for example PET);
filling the containers 11 with liquid or semi-liquid food products;
moulding caps 14 from plastic material 5 in raw form;
capping the full containers 18;
setting up a warehouse 2 configured to contain the parisons 4 and the caps 14 and, if necessary, also the containers 11.

The method of the invention comprises a step of pressurizing (or for the forced circulation of a predetermined gas or for the sterilisation of) the warehouse 2 in order to define therein a controlled atmosphere environment which is preferably (but not necessarily) sterile.

Thus, the method comprises transferring the objects (parisons 4, containers 11 and caps 14) circulating in the line 1 in a controlled atmosphere environment within an integrated system defined by the warehouse 2 and by the units making up the line 1.

Preferably, there is also a step of controlling the line 1, with the possibility of managing the warehouse 2 and the units (generally speaking, the units concerned are those labelled 3, 6, 10, 12, 13, 15 and 17) according to (one or more of) the following operating configurations (alternatively or in combination):
the thermal conditioning unit 6 is in parison 4 heating mode and feeds the blow-moulding unit 10;

the thermal conditioning unit 6 is in parison 4 cooling mode and feeds the warehouse 2;

the cap moulding unit 13 feeds the capping unit 15;

the cap moulding unit 13 feeds the warehouse 2.

Preferably, the step of controlling the line 1 comprises managing the warehouse 2 and the units according to (one or more of) the following operating configurations (alternatively or in combination):

feeding the blow-moulding unit 10 with the parisons 4 from the heating sub-unit 7 of the thermal conditioning unit 6;

feeding the heating sub-unit 7 of the thermal conditioning unit 6 with the parisons 4 from the warehouse 2 and simultaneously transferring the parisons 4 from the parison 4 moulding unit 3 to the warehouse 2;

transferring the caps 14 from the cap moulding unit 13 to the warehouse 2 while the warehouse 2 feeds the capping unit 15.

The method also comprises a step of creating and maintaining the controlled atmosphere environment (preferably, but not necessarily, aseptic) during the operation of the line.

The invention claimed is:

1. A continuous cycle bottling line for containers of thermoplastic material, comprising:

a parison moulding unit for making parisons of thermoplastic material from the thermoplastic material in its raw form;

a parison thermal conditioning unit configured to receive the parisons from the parison moulding unit and to heat and cool the parisons, wherein the conditioning unit includes a heating sub-unit and a cooling sub-unit;

a blow-moulding unit configured to receive the heated parisons from the conditioning unit and to blow-mould them in such a way as to make containers designed to be filled;

a filling unit configured to receive the containers from the blow-moulding unit and to fill them with liquid or semi-liquid food products;

a capping unit configured to receive caps made of thermoplastic material and to apply the caps securely to respective full containers;

a storage system configured to contain the parisons and connected to the thermal conditioning unit by a first conveyor, designed to transfer the parisons from the cooling sub-unit of the conditioning unit to the storage system, so that the storage system receives parisons to be stored, and by a second conveyor, designed to transfer the parisons from the storage system to the heating sub-unit of the conditioning unit, to feed the selfsame heating sub-unit of the thermal conditioning unit with parisons stored previously, wherein the cooling sub-unit is connected directly to the parison moulding unit, the first conveyor thus connecting the parison moulding unit to the storage system, wherein the first conveyor has a first end, proximal to the parison moulding unit and distal to the storage system, and a second end, distal to the parison moulding unit and proximal to the storage system, the cooling sub-unit is positioned at the first end of the first conveyor, wherein the storage system includes outlet vents and inlet vents cooperating with fans to provide a pressurization system for generating overpressure inside the storage system, and wherein the bottling line defines an integrated system where the connections between the parison moulding unit, the thermal conditioning unit, the blow-moulding unit, the filling unit, the capping unit and the storage system define inside them a controlled-atmosphere environment, and wherein said connections are enclosed within respective ducts, wherein the ducts delimit closed spaces and include outlet vents, so that an internal overpressure is provided inside the ducts, wherein the overpressure maintained inside the ducts is lower than the overpressure pressure provided in the storage system or in the units connected by the connections.

2. The bottling line according to claim 1, comprising a moulding unit for making caps of plastic material from plastic material in its raw form, the capping unit being configured to receive the caps from the cap moulding unit, wherein the storage system is configured to also contain caps and is connected by one or more conveyors to the cap moulding unit to receive caps to be stored and to the capping unit to feed the latter with caps stored previously, and wherein the connections between the cap moulding unit, the capping unit and the storage system define inside them a controlled-atmosphere environment.

3. The bottling line according to claim 2, comprising a management unit connected to the storage system, to the thermal conditioning unit, to the cap moulding unit and to the capping unit and programmed to control the storage system and the units according to the following operating configurations:

the thermal conditioning unit is in parison heating mode and feeds the blow-moulding unit;

the thermal conditioning unit is in parison cooling mode and feeds the storage system;

the cap moulding unit feeds the capping unit;

the cap moulding unit feeds the storage system.

4. The bottling line according to claim 3, wherein the thermal conditioning unit comprises a heating sub-unit having infeed connected to the parison moulding unit and to the storage system and outfeed connected to the blow-moulding unit, and a cooling sub-unit having infeed connected to the parison moulding unit and outfeed connected to the storage system, and wherein the management unit is programmed to control the storage system and the units of the line according to the following operating configurations:

the cooling sub-unit is off, while the heating sub-unit is on and receives the parisons from the parison moulding unit and feeds them to the blow-moulding unit;

the cooling sub-unit is on and receives the parisons from the parison moulding unit and feeds them to the storage system, while the heating sub-unit is on and receives the parisons from the storage system and feeds them to the blow-moulding unit;

the cap moulding unit feeds the storage system while the storage system feeds the capping unit.

5. The bottling line according to claim 3, wherein the blow-moulding unit and the filling unit are connected to the storage system and wherein the management unit is programmed to control the storage system and the units of the line according to the following operating configurations:

the blow-moulding unit feeds the filling unit with the containers;

the blow-moulding unit feeds the storage system with the containers;

the storage system feeds the filling unit with the containers.

6. The bottling line according to claim 5, comprising a labelling unit having an infeed connected to the storage system and to the outfeed of the blow-moulding unit, and an outfeed connected to the filling unit, wherein the connections between the labelling unit and the storage system, between the labelling unit and the blow-moulding unit and between the labelling unit and the filling machine are located in a controlled atmosphere environment, wherein the management unit is programmed to control the storage system and the units of the line according to an operating configuration where the storage system feeds the labelling unit with the containers and the labelling unit feeds the filling unit with the labelled containers.

7. The bottling line according to claim 1, wherein the parison moulding unit comprises a rotary compression moulding machine.

8. The bottling line according to claim 7, comprising a further parison moulding unit having a moulding machine which works by injection or by injection combined with compression, the further moulding unit being connected to the storage system for the feeding thereof, wherein the connection defines for the parisons a path contained in a controlled atmosphere environment.

9. The bottling line according to claim 1, comprising a labelling unit whose infeed is connected to the outfeed of the capping unit, or whose infeed is connected to the outfeed of the blow-moulding unit and whose outfeed is connected to the infeed of the filling unit, wherein the connections between the labelling unit and the capping unit or between the labelling unit and the blow-moulding unit and the filling unit are located in a controlled atmosphere environment.

10. The bottling line according to claim 1, comprising a sterilizer operating in the controlled atmosphere environment in order to make it an aseptic environment.

11. The bottling line according to claim 1, wherein all the units making up the line are connected in such a way that the products transferred from one unit to the other, be they parisons, containers or caps, are in step with each other at all times.

12. The bottling line according to claim 1, wherein the storage system is internally pressurized with ionized gas.

13. The bottling line according to claim 1, wherein the integrated system, comprising parison moulding unit, the thermal conditioning unit, the blow-moulding unit, the filling unit, the capping unit and the storage system, internally defines a plurality of corresponding pressurized, interconnected spaces to allow the parisons to move within the line while remaining in a controlled-atmosphere environment at all times.

14. The bottling line according to claim 13, comprising a plurality of outlet vents which operate on corresponding spaces forming part of the plurality of spaces to keep them at respective reference pressures.

15. The bottling line of claim 1, wherein said closed spaces are pressurized independently of each other.

16. The bottling line of claim 1, wherein the ducts which enclose the connections to the storage system are at an internal pressure which is lower than that of the storage system.

17. The bottling line of claim 1, wherein the ducts which enclose the connections to the units are at an internal pressure which is lower than that of the units which they connect.

18. The bottling line of claim 1, wherein the storage system includes: a plurality of drawers; a structure defining a plurality of housings for the drawers, wherein said housings are arranged in a plurality of juxtaposed columns; at least one lift having a carriage designed to receive and move the drawers.

19. A continuous cycle method for bottling containers of thermoplastic material, comprising the following steps:
moulding parisons from thermoplastic material in raw form in a parison moulding unit;
thermally conditioning the parisons by the heating and cooling thereof in a thermally conditioning unit, wherein the parisons are cooled in a cooling sub-unit of the thermally conditioning unit and heated in a heating sub-unit of the thermally conditioning unit, wherein the parisons are transferred from the parison moulding unit directly to the cooling sub-unit of the thermally conditioning unit, through a first conveyor which connects the parison moulding unit to the storage system, wherein the first conveyor has a first end, proximal to the parison moulding unit and distal to the storage system, and a second end, distal to the parison moulding unit and proximal to the storage system, the cooling sub-unit is positioned at the first end of the first conveyor;
blow-moulding the heated parisons in order to make containers of thermoplastic material in a blow-moulding unit;
filling the containers with liquid or semi-liquid food products in a filling unit;
capping the full containers in a capping unit;
setting up a storage system configured to contain the parisons,
generating inside the storage system an overpressure through a pressurization system provided in the storage system, the pressurization system including outlet vents and inlet vents cooperating with fans for generating overpressure inside the storage system,
and wherein the parison moulding unit, the thermally conditioning unit, the blow-moulding unit, the filling unit, the capping unit and the storage system constitute a bottling line which defines an integrated system where the movements for transferring the parisons and the containers between the selfsame units and between the storage system and at least the thermal conditioning unit are carried out in a controlled-atmosphere environment, through ducts, wherein the ducts delimit closed spaces and include outlet vents, and wherein overpressure is maintained inside the ducts which is lower than the internal pressure of the storage system or of the units connected through the ducts.

20. The method according to claim 19, comprising a step of moulding caps from plastic material in raw form, in a cap moulding unit, wherein the storage system is configured to also contain caps and wherein the movements by which the caps are transferred within the integrated system are carried out in a controlled-atmosphere environment inside the line.

21. The method according to claim 20, comprising a step of controlling the bottling line, with the possibility of managing the storage system and the units according to the following operating configurations:
the thermal conditioning unit is in parison heating mode and feeds the blow-moulding unit;
the thermal conditioning unit is in parison cooling mode and feeds the storage system;
the cap moulding unit feeds the capping unit;
the cap moulding unit feeds the storage system.

22. The method according to claim 21, wherein the thermally conditioning unit includes a heating sub-unit and wherein the controlling step comprises managing the storage system and the units according to the following operating configurations:
feeding the blow-moulding unit with the parisons feeding out of the heating sub-unit of the thermal conditioning unit;
feeding the heating sub-unit of the thermal conditioning unit with the parisons feeding out of the storage system and simultaneously transferring the parisons from the parison moulding unit to the storage system;

transferring the caps feeding out of the cap moulding unit to the storage system while the storage system feeds the capping unit.

23. The method according to claim 19, wherein the controlled atmosphere environment is kept in an aseptic state during the operation of the line.

24. The method according to claim 19, wherein the integrated system, comprising the parison moulding unit, the thermal conditioning unit, the blow-moulding unit, the filling unit, the capping unit and the storage system, internally defines a plurality of corresponding pressurized, interconnected spaces, so that the parisons are moved within the line along predetermined paths which remaining in a controlled-atmosphere environment at all times inside the line.

25. The method according to claim 24, comprising a step of pressurizing the corresponding spaces forming part of the plurality of spaces to keep them at respective reference pressures.

* * * * *